United States Patent [19]

Wolff et al.

[11] Patent Number: 4,517,336
[45] Date of Patent: May 14, 1985

[54] RUBBER MIXTURES GIVING REVERSION-FREE VULCANIZATES AND PROCESS OF VULCANIZATION

[75] Inventors: Siegfried Wolff, Bornheim-Merten; Ewe-Hong Tan, Brühl, both of Fed. Rep. of Germany

[73] Assignee: Degussa Aktiengesellschaft, Frankfurt am Main, Fed. Rep. of Germany

[21] Appl. No.: 270,131

[22] Filed: Jun. 3, 1981

Related U.S. Application Data

[63] Continuation of Ser. No. 92,519, Nov. 8, 1979, abandoned.

[30] Foreign Application Priority Data

Nov. 9, 1978 [DE] Fed. Rep. of Germany ....... 2848559

[51] Int. Cl.$^3$ .................... C08L 9/00; C08L 83/08
[52] U.S. Cl. ................... 524/571; 152/330 R; 152/374; 156/110.1; 524/262; 524/575; 525/102; 525/191
[58] Field of Search ............... 525/102, 191; 524/571, 524/262, 575; 260/762, 763, 765; 156/110 R; 152/330 R, 374

[56] References Cited

U.S. PATENT DOCUMENTS

| 3,842,111 | 10/1974 | Simon | 556/426 |
| 3,873,489 | 3/1975 | Thurn et al. | 524/262 |
| 4,229,333 | 10/1980 | Wolff et al. | 524/571 |

FOREIGN PATENT DOCUMENTS

| 2536674 | 2/1977 | Fed. Rep. of Germany | 524/571 |
| 1505692 | 3/1978 | United Kingdom . | |

Primary Examiner—Jacob Ziegler
Attorney, Agent, or Firm—Cushman, Darby & Cushman

[57] ABSTRACT

Mouldable and vulcanisable rubber mixtures are made containing a rubber (A) which still contains double bonds and which is cross-linkable by means of sulphur and a vulcanization accelerator or a mixture of rubber (A) with a different rubber (B), 0.2 to 10 parts of sulphur, 0.2 to 10 parts of a vulcanization accelerator and 1.0 to 10 parts of a bis-(alkoxysilylalkyl)polysulfide.

There can also be present a silicate filler and/or a carbon black filler of rubber. The rubber mixtures have the silane, vulcanization accelerator and sulphur, calculated as $S_8$ present in a molar ratio which causes the rubber mixture to have a reversion R=0 ($\pm 5\%$) resulting from the cross-linking isotherm at the vulcanization temperature where the reversion R is calculated according to Formula II $$R = \frac{D_{max} - D_{(max+60\ min.)}}{D_{max} - D_{min}} \cdot 100$$

in which $D_{max}$ is the maximum vulcameter moment of rotation
$D_{min}$ is the minimum vulcameter moment of rotation
$D_{(max+60\ min)}$ is the vulcameter moment of rotation measured 60 minutes after the appearance of the maximum moment of rotation.

There is also disclosed the process of vulcanizing the above-mentioned rubber mixtures or moulding compositions and forming vehicle tires using the rubber mixtures.

53 Claims, No Drawings

RUBBER MIXTURES GIVING REVERSION-FREE VULCANIZATES AND PROCESS OF VULCANIZATION

This is a continuation of application Ser. No. 092,519 filed Nov. 8, 1979 and now abandoned

BACKGROUND OF THE INVENTION

The vulcanisation behaviour of a rubber mixture may be represented for example by means of a Vulcameter Curve. The Vulcameter curve is formed by plotting the torques (moment of rotation), determined with a Vulcameter as described in DIN 53 529 (German Industrial Standard 53529), on the abscissa of a rectangular co-ordinate system against the vulcanisation time on the ordinate. The entire disclosure of DIN 53529 is hereby incorporated by reference and relied upon. The onset of vulcanisation is shown by the ascending branch of the vulcameter curve. Thereafter the curve normally reaches a maximum or indicates a maximum value and, in most cases, descends more or less quickly or slowly as vulcanisation continues. Vulcameter curves recorded at a constant temperature may also be called crosslinking isotherms.

In the vulcanisation of rubber mixtures based on natural or synthetic rubbers in the presence or absence of rubber fillers by means of sulphur and vulcanisation accelerators, as normally practised in industry, these crosslinking isotherms normally pass through a maximum which is formed as a result of the fact that, during the complex chemical processes occuring during vulcanisation, the build-up of polysulphidic crosslinks between the rubber molecules predominates in the initial stage, whereas in the final stage the degradation of intermolecular polysulphidic and disulphidic bridge bonds to intramolecular heterocyclic rings occurs in the final stage. In a crosslinking isotherm obtained by vulcametry, these phenomena are shown by a continuous downward trend of the crosslinking isotherm, i.e. in a fall in the torque (moment of rotation) values and, in practice, the moduli decrease with increasing vulcanisation time. The change in the relative crosslink density of the vulcanisate (level of the torques) and the relative crosslink density present at any stage of the vulcanisation proces may be read off from the trend of the vulcametrically determined crosslinking isotherm. The change in the crosslink densities is accompanied by a change in the mechanical properties of the vulcanisates (where this property is dependent upon the crosslink density), such as their tensile strength, breaking elongation (elongation at break), elasticity, Shore hardness, heat build up, abrasion, etc.

In practice, the downwardly sloping branch of the vulcameter curve signifies a deterioration in the above mentioned properties of the vulcanisate. This phenomenon is technically known as "reversion". On account of the change in the mechanical properties of the vulcanisates by which reversion is accompanied, reversioning vulcanisates are generally undesirable. This applied in particular in the production of thick-walled rubber articles because the poor thermal conductivity of articles such as these in their individual discrete regions (volume elements) can give rise to differing mechanical properties which means that, on completion of vulcanisation, the vulcanisate is not homogeneous in regard to its crosslink density. In the case of thick-walled rubber articles, the appearance of reversion necessitates a distinct reduction in the vulcanisation temperature in order to postpone the onset of reversion. Another notorious phenomenon is that reversion increases with increasing temperature. Any reduction in temperature during the vulcanisation of thick-walled articles results in a commensurate increase in the heating times. For example, the heating times for heavy duty off the road tires ranges from about 10 to 14 hours at a vulcanisation temperature of 120° C.

Now, a significant aim which the present invention sought to attain was to enable the vulcanisation temperatures to be increased without any adverse effects on the properties of the vulcanisates, i.e. to avoid unfavourable reversion phenomena and considerably to shorten the heating times (vulcanisation times) so that the production facilities may be distinctly better utilised and a faster output or higher productivity is achieved.

It is known that oligosulphidic silanes may be used in the vulcanisation of rubber mixtures with sulphur to make the mixtures with silicate fillers added thereto easier to process and to obtin vulcanisates equivalent or superior in quality to vulcanisates obtained from mixtures filled with carbon black (cf. German Pat. No. 2,255,577 or Thurn U.S. Pat. No. 3,873,489). The entire disclosure of the Thurn U.S. patent is hereby incorporated by reference and relied upon. A typical representative of these oligosulphidic silanes is 3,3-bis-(triethoxysilylpropyl)-tetrasulphide or the commercial product Si 69.

It is also known from German Offenlegungsschrift No. 2,536,674 and related Wolff U.S. application Ser. No. 34203, filed Apr. 27, 1979, now U.S. Pat. No. 4,229,333 that rubber mixtures containing silicate fillers can be crosslinked solely with oligosulphidic silanes and vulcanisation accelerators, i.e. without elemental sulphur or sulphur donors. In this case, mixtures of silica and carbon black are advantageously used as fillers. The entire disclosure of German OS 2,536,674 and the Wolff application are hereby incorporated by reference and relied upon.

Crosslinking agents with which attempts have been made to avoid reversion phenomena, particularly in the case of reversion-prone rubbers, such as natural rubber and polyisoprene, have long been known in the rubber-processing industry. These crosslinking agents are, for example, peroxides which lead to —C—C-crosslinking(carbon-carbon cross-linking) or thiuram disulphides which form —C—S—C—bridge bonds. Accordingly, the development of polysulphidic degradable crosslinks as described above is avoided. Systems of the type in question also include vulcanisation systems using so-called sulphur donors which, in terms of function, are distinguished by the fact that, once again, no polysulphidic crosslinks are formed in contrast to standard sulphur vulcanisation. They also include crosslinking systems whose function is based on the fact that, where basically crosslinking accelerators are used, crosslinking is controlled by the addition of small quantities of sulphur in such a way that predominantly monosulphidic bridge bonds, i.e. bridge bonds which cannot be further degraded, are formed.

However, the avoidance of polysulphidic crosslinks is also associated with changes in the properties of the vulcanisates which are undesirable. For example, the tensile strengths and breaking elongations (elongations at break) are reduced for the same crosslink density by comparison with sulphur vulcanisates and, what is more important, the tear initiation and tear propagation resistance is drastically reduced. One particularly unfavourable aspect of this method of vulcanisation is the increase in damage to vulcanisates, for example in the form of chipping and chunking effects, which seriously restricts the use of systems such as these so that it is better to work at a low vulcanisation temperature with conventional sulphur/accelerator systems, i.e. to accept and mimimise the reversion phenomena.

The above mentioned vulcanisation systems which impart resistance to reversion are even less applicable to rubber mixtures containing silicate fillers or mixture of carbon blacks with silicate fillers. The silicate fillers disrupt in particular with these vulcanisation systems to such an extent that an adequate crosslink density cannot be obtained, even by using the crosslinking agents in very large quantities.

Accordingly, the use of the described crosslinking systems which impart resistance to reversion is severly restricted and confined to special types of rubber, and cannot or can only be used to a very limited extent, in those rubbers normally used for a wide range of applications, such as natural rubber and styrene-butadiene rubbers.

Accordingly, another problem which the present invention sought to solve was to find a crosslinking system which could be used in as many types of rubber as possible, preferably in natural rubbers and polyisoprenes, with the object of producing therefrom vulcanisates which do not have any of the numerous unfavourable properties associates with reversion.

SUMMARY OF THE INVENTION

According to the invention there are prepared formable (mouldable) vulcanisable rubber mixtures which, in addition to the usually optional ingredients, such as antiagers, heat stabilisers, light stabilisers, ozone stabilisers, vulcanisation retarders, plasticisers, tackifiers, blowing agents, processing aids, dyes, pigments, waxes, extenders, organic acids, lead oxide, zinc oxide and/or activators in the usual quantities contain at least one rubber (A) which still contains double bonds and which can be crosslinked with sulphur and vulcanisation accelerator(s) to form elastomers or a mixture of one or two of these rubbers (A) with one or two of the rubbers (B) and from 0.2 to 10 parts by weight of sulphur, from 0.2 to 10 parts by weight of at least one vulcanisation accelerator and from 1 to 10 parts by weight of at least one silane corresponding to the formula $$[R_n^1(RO)_{3-n}Si\text{-Alk-}]_2S_x \qquad (I)$$

in which

R and $R^1$ represent an alkyl group containing from 1 to 4 carbon atoms, a cycloalkyl group containing from 5 to 8 carbon atoms or the phenyl radical; all the radicals R and $R^1$ may be the same or different in meaning, n=0, 1 or 2, Alk is a difunctional straight-chain or branched hydrocarbon radical containing from 1 to 10 carbon atoms, and x is a number of from 2.0 to 8.0 or its hydrolysate and, optionally (and preferably) from 1 to 300 parts by weight of at least one silicate filler and/or 0.1 to 150 parts by weight of at least one carbon black filler, the total amount of filler amounting to at most 300 parts by weight and all parts by weight being based on 100 parts by weight of rubber, characterised in that the rubber mixture contains silane, vulcanisation accelerator and sulphur, expressed as $S_8$, in such a molar ratio that, at the vulcanisation temperature, the rubber mixture has the reversion R resulting from the crosslinking isotherm (DIN 53 529) of 0 ($\pm 5\%$), R being calculated in accordance with the following formula:

$$R = \frac{D_{max} - D_{(max+60\ mins.)}}{D_{max} - D_{min}} \cdot 100 \qquad (II)$$

in which $D_{max}$ is the maximum vulcameter torque, (moment of rotation)

$D_{min}$ is the minimum vulcameter torque, (moment of rotation)

$D_{(max+60\ mins)}$ is the vulcameter torque as measured 60 minutes after appearance of the maximum torque.

In a preferred form of the invention, where natural rubber and/or polyisoprene rubber is used, the mixture contains the silane Si 69, (industrial bis (3-triethoxysilyl-propyl)-oligosulfide containing at least 22.0 weight % sulphur), the sulphenamide vulcanisation accelerator and the sulphur ($S_8$) in a molar ratio of 1:1:1 (deviation $\pm 0.1$ in each case) at a vulcanisation temperature of 145° C. ($\pm 3°$ C.).

In one preferred form of the invention there is also present 0.05 to 5 parts by weight of a vulcanisation retarder per 100 parts by weight of rubber. The preferred vulcanisation retarder is N-cyclohexylthiophthalimide and/or polynitroso-2,2,4-trimethyl-1,2-dihydroquinoline.

The invention also includes a process for vulcanising mouldable compositions of the type described.

Preferably there is employed in the process a mixture based on natural and/or polyisoprene rubber, which contains a silane of the formula $[(C_2H_5O)_3Si\text{-}(CH_2)_3\text{-}]_2S_x$, in which x=3.0 to 4.0, or the silane Si 69, the vulcanisation accelerator(s) from the class of sulphenamide accelerators and the sulphur, expressed as $S_8$, in a molar ratio of 1:1:1 (with a deviation of $\pm 0.1$ in each case), the composition vulcanised at 145° C. ($\pm 3°$ C.) and, on completion of vulcanisation, is cooled or left to cool.

The rubber mixtures of the invention are used for the production of motor vehicle tires, particularly car, truck and off the road vehicles tires.

Accordingly, it is possible for the first time to control vulcanisation in such a way that a lasting condition of the quasi-constant crosslink density occurs, in other words the number of crosslinks produced per unit of time by the oligosulphidic silane is just compensated by the reversion induced crosslink degradation per unit of time at a constant vulcanisation temperature. The above mentioned condition is surprisingly achieved by adjusting the molar ratio of silane to accelerator to sulphur and is, as it were, frozen by terminating vulcanisation, i.e. by cooling. The reversion R is determined in percent in accordance with the following formula:

$$R = \frac{D_{max} - D_{(max+60\ mins)}}{D_{max} - D_{min}} \cdot 100 \qquad (II)$$

in which $D_{max}$ is the maximum torque, $D_{min}$ is the minumum torque, $D_{(max+60\ mins)}$ is the torque measured 60 minutes after appearance of the maximum torque.

According to the invention, a reversion R of nil (±5%) is achieved.

The above mentioned torques (moments of rotation) are taken from vulcametrically measured crosslinking isotherms. An MPV Rheometer of the type manufactured by Monsanto Europe S.A., B-1150 Brussels, was used as the vulcameter.

With regard to the expressions "vulcametry" and "crosslinking isotherm", reference is made to the Tentative Standard DIN 53 529 of February, 1971, cf. in particular page 1.

For the rest, vulcanisation is carried out by the methods normally used in the rubber industry. In this connection, reference is made for example to "Kautschuk-Handbuch" by Dr. Siegfried Boström (Verlag Berliner Union, Stuttgart, 1959) or to A. S. Craig "Rubber Technology" (London, 1963).

The rubbers(A) which may be used in accordance with the invention include any rubbers which still contain double bonds and which may be crosslinked with sulphur and vulcanisation accelerator(s) to form elastomers and mixtures of such rubbers. The rubbers in question are in particular the halogen-free rubbers, preferably the so-called diene elastomers. Rubbers of this type include, for example, optionally oil-extended natural and synthetic rubbers, such as natural rubbers, butadiene rubbers, isoprene rubbers, butadiene-styrene rubbers, butadiene acrylonitrile rubbers, butyl rubbers, terpolymers of ethylene, propylene and, for example, non-conjugated dienes, e.g. norbornene cyclooctadiene, dicyclopentadiene. The following additional rubbers (B) may be used for rubber mixtures with the above mentioned rubbers: carboxyl rubbers, epoxide rubbers, trans-polypentenamer, halogenated butyl rubbers, rubbers of 2-chlorobutadiene, ethylene-vinyl acetate copolymers, ethylene-propylene copolymers and even chemical derivatives of natural rubber as well as modified natural rubbers. It is preferred to use natural rubbers and polyisoprene rubbers either individually or in admixture with one another and/or in admixture with the above mentioned rubbers.

The silicate fillers which, according to the invention optionally form an ingredient of the mixture (even in the form of a mixture of two or more of these fillers) are fillers known per se in rubber technology. The expression "silicate filler" is a broad definition and covers fillers which consist of silicates, contain silicates and/or include silicates in the broadest sense in chemically bound form and which are compatible with rubbers and may be worked into rubber mixtures. These silicate fillers include in particular:

Highly dispersed silicas (silicon dioxide) having specific surface areas in the range from about 5 to 1000 $m^2/g$ and preferably in the range from 20 to 400 $m^2/g$ (as determined with gaseous nitrogen by the known BET method) and primary particle sizes in the range from 10 to 400 nm which may be produced for example by precipitation from solutions of silicates, by the hydrolytic and/or oxidative high temperature reaction, also known as flame hydrolysis, of volatile silicon halides e.g. silicium tetra—chloride or by an arc process. These silicas may even be present in the form of mixed oxides or oxide mixtures with oxides of the metals aluminum, magnesium, calcium, barium, zinc, zirconium and/or titanium.

Synthetic silicates, for example aluminum silicate, or alkaline-earth silicates, such as magnesium or calcium silicate, having specific surfaces of from about 20 to 400 $m^2/g$ and primary particle sizes of from about 10 to 400 nm.

Natural silicates, for example kaolins and asbestoses, and natural silicas, such as for example quartz and kieselguhr.

Glass fibres and glass fibre products, such as mats, strands, woven cloths, non-woven structures and the like, and also glass microbeads.

The above mentioned silicate fillers are used in quantities of from 1 to about 300 parts by weight, based on 100 parts by weight of the rubber polymer. To obtain white rubber mixtures these can contain as the sole fillers one or more silicate fillers. Preferably there is then employed at least 5 parts by weight of the silicate per 100 parts by weight of rubber.

Examples of filler mixtures include silica/kaolin or silica/glass fibres/asbestos and also blends of the silicate reinforcing fillers with known rubber-grade carbon blacks, for example silica/ISAF-carbon black, silica/HAF-carbon black or silica/glass fibre cord/HAF-carbon black.

Typical representatives of the silicate fillers which may be used in accordance with the invention are, for example, the silicas and silicates manufactured and marketed by DEGUSSA under the trade names AEROSIL ®, ULTRASIL ®, SILTEG ®, DUROSIL ®, EXTRUSIL ®, CALSIL ®, and others. According to the invention, preferred silicate fillers are the above mentioned highly disperse or active silicas, particularly the precipitated silicas, used in quantities of from 10 to 250 parts by weight, based on 100 parts by weight of rubber.

Carbon black may be present as filler in the rubber mixtures according to the invention either on its own or in addition to other fillers not only for greying or blackening the vulcanisates, but also for obtaining the well-known, valuable vulcanisate properties. It is preferred to use the known rubber-grade carbon blacks. Carbon blacks such as these are the commercial products manufactured and marketed by DEGUSSA (Frankfurt-on-Main, P.O. Box 2644) under the trade name CORAX ® black. The carbon black or mixtures of carbon black are used in quantities of from 0.1 to 300 parts by weight and preferably in quantities of up to 150 parts by weight, based on 100 parts by weight of rubber, in the new rubber mixtures.

Where silicate filler and carbon black are present in the rubber mixtures, the total filler content, based on 100 parts by weight of rubber, is limited to at most 500 parts by weight and preferably to at most 300 parts by weight.

The rubber mixtures always contain one or more accelerators as well. Accelerators are understood to be the known vulcanisation accelerators, such as the dithiocarbamate, xanthogenate and thiuram accelerators, also the thiazole accelerators, including the mercapto and sulphenamide accelerators, amine accelerators and aldehyde amine accelerators, basic accelerators, including for example the guanidine accelerators and other basic accelerators; see "Vulkanisation und Vulkanisationshilfsmittel (Vulcanisation and Vulcanisation Aids)", a comprehensive account by Dr. W. HOFMANN, Leverkusen (Verlag Berliner Union, Stuttgart, 1965, pages 114 et seq, particularly page 122), and—irrespective of the above classification—the general vulcanisation accelerator classes of the mercapto, disulphide, polysulphide, sulphenamide, thiazole and thiourea accelerators.

It is preferred to use the sulphenamide accelerators, such as those disclosed in British Pat. No. 1,201,862 and related Westlinning U.S. Pat. No. 3,801,537 including 2-diethylamino-4,6-bis-(cyclohexylsulphenamido)-s-triazine and 2-di-n-propylamino-4,6-bis-(N-t-butylsulphenamido)-s-tirazine, also N-cyclohexyl-2-benzthiazole sulphenamide, benzthiazole-2-sulphene morpholide, N-t-butyl-2-benzothiazyl sulphenamide, N,N-dicyclohexyl-2-benzothiazyl sulphenamide, N-oxydiethylene-2-benzothiazosulphenamide, benzothiazole sulphene-t-octylamide and N,N-di-i-propyl-2-benzothiazyl sulphenamide. The entire disclosure of Westlinning is hereby incorporated by reference and relied upon. Other suitable accelerators or co-accelerators are the tetra-alkyl and dialkyl diaryl thiuram mono-, di- and tetra-sulphides, such as tetramethyl thiuram monosulphide, tetramethyl thiuram disulphide, tetraethyl thiuram disulphide, dipentamethylene thiuram monosulphide, -disulphide, -tetrasulphide and -hexasulphide, dimethyl diphenyl thiuram disulphide, diethyl diphenyl thiuram disulphide and similar known thiuram accelerators.

Suitable dithiocarbamate accelerators are the derivatives of dialkyl, alkylcycloalkyl and alkyl aryl dithiocarbamic acids. Two known representatives of this class of accelerators are N-pentamethylene ammonium-N'-pentamethylene dithiocarbamate and the zinc dialkyl dithiocarbamates e.g. zinc diethyl dithiocarbamate, zinc dimethyl dithiocarbamate and zinc dibutyl dithiocarbamate.

Xanthogenate accelerators are the known derivatives of alkyl and aryl xanthogenic acids, such as for example zinc ethyl xanthogenate.

Suitable mercapto accelerators are, in particular, 2-mercaptobenzthiazole, 2-mercaptoimidazoline, mercaptothiazoline and a number of monomercapto and dimercapto triazine derivatives (cf. for example British Pat. No. 1,095,219 and related Westlinning U.S. Pat. No. 3,366,598, the entire disclosures of which are hereby incorporated by reference and relied upon), also mercaptotriazine accelerators such as, for example, 2-diethanolamino-4,6-bis-mercaptotriazine and 2-ethylamino-4-diethylamino-6-mercapto-s-triazine.

Suitable disulphide accelerators are bis-(2-ethylamine-4-diethylaminotriazine-6-yl)-disuphide, bis-(2-methylamino-4-di-i-propylaminotriazin-6-yl)-disulphide and dibenzothiazyl disulphide, also the polysulphidic or oligosulphidic triazine derivatives and their polymers which are produced in accordance with German Offenlegungsschrift No. 2,027,635 and which are also disclosed in British Pat. No. 1,353,532 and Wolff U.S. Pat. No. 3,775,366. The entire disclosures of these three patents are hereby incorporated by reference and relied upon.

Suitable aldehyde amine accelerators include condensation products of saturated or unsaturated aliphatic aldehydes with ammonia or aromatic amines, such as for example butyraldehyde aniline and butyraldehyde butylamine. Other basic accelerators are, for example, guanidine derivatives, such as diphenyl guanidine and di-o-tolyl guanidine, and hexamethylene tetramine. Suitable thiourea accelerators are for example thiourea itself and the diaryl thioureas, such as 1,3-diphenyl-2-thiourea.

According to the invention, it is also possible to use mixtures of two, three or more accelerators, particularly the accelerator mixtures known in rubber technology, in the new rubber mixtures, mixtures of sulphenamide accelerators in a predominant quantity and thiuram accelerators in a smaller quantity being preferred. For example, the quantity of thiuram accelerator may amount for example to between one fifth and one twentieth of the quantity of sulphenamide accelerator.

The vulcanisation accelerators are present in the rubber mixture in quantities of from 0.2 to 10 parts by weight, based on 100 parts by weight of rubber, and in addition are in the claimed molar ratio to the organosilane and the sulphur.

It may be of advantage for one or more triazine sulphenimides or dicarboxylic acids to be worked into, or to be additionally present in, the new rubber mixtures. These triazine sulphenimides are disclosed in German Offenlegungsschrift No. 2,430,143 and related Schwarze U.S. Pat. No. 3,969,353. The entire disclosures of these two patents are hereby incorporated by reference and relied upon. They are dicarboxylic acid imides attached once or twice to the s-triazine ring through a divalent sulphur atom, such as imides of for example succinic acid, glutaric acid, phthalic acid, tetrahydrophthalic acid, etc. and (alkyl) derivatives thereof. Chemical compounds such as these are, for example, 2-ethylamino-4-diethylamino-6-phthalimido-thiotriazine, 2-diethylamine-4,6-phthalimido-thiotriazine, 2-diethylamino-4,6-bis-(5,5-dimethylhydantoyl)-thiotriazine, 2-diethylaminotriazinyl-4,6-bis-thio-(3,5-dimethyl cynurate), 2-diethylamino-4,6-bis-succinimido-thiotriazine and inter alia 2-dimethylamino-4,6-bis-succinimido-thiotriazine.

These triazine sulphenimides may be added to the rubber mixtures in quantities of from 0.01 to 10 parts by weight, based on 100 parts by weight of rubber. It is also possible with advantage to use commercial vulcanisation retarders, in some cases even in addition, for example in quantities of from 0.05 to 5 parts by weight, based on 100 parts by weight of rubber. Vulcanisation retarders such as these are, for example benzoic acid, salicylic acid, phthalic acid anhydride, N-nitrosodiphenylamine and other retarders known per se, preferably N-cyclohexyl thiophthalimide and polynitroso-2,2,4-trimethyl-1,2-dihydroquinoline.

The sulphur, in the claimed quantities and in the claimed molar ratio to silane and accelerator, is used in the form of elemental sulphur in the usual purity and in powder form or in the form of rubber-active or insoluble sulphur.

The oligosulphidic organosilanes corresponding to general formula I above are known per se and may be obtained by known methods (cf. for example Belgian Pat. No. 787,691, Meyer-Simon U.S. Pat. No. 3,842,111 and Thurn U.S. Pat. No. 3,873,489. The entire disclosure of these three patents are hereby incorporated by reference and relied upon). Examples of preferred organosilanes are the bis-(trialkoxysilylalkyl)-oligosulphides, such as bis-(trimethoxy-, -triethoxy-, -trimethoxyethoxy-, -tripropoxy-, tributoxy-, tri-i-propoxy- and -tri-i-butoxy-silylmethyl)-oligosulphides and, in particular, the di-, tri-, tetra-, penta-, hexasulphides etc., also bis-(2-trimethoxy, -triethoxy-, -trimethoxyethoxy-, -tripropoxy, and -tri-n- and -i-butoxyethyl)-oligosulphides and, in particular, the di-, tri-, tetra-, penta-, hexa-sulphides etc., also the bis-(3-trimethoxy-, -triethoxy-, -trimethoxyethoxy-, -tripropoxy-, -tri-n-butoxy- and -tri-i-butoxy-silylpropyl)-oligosulphides, particularly the di-, tri-, tetra-sulphides etc. up to octasulphides; the corresponding bis-(3-trialkoxy-silylisobutyl)-oligosulphides and so on up to the bis-(8-trialkoxysilyloctyl)- oligosulphides. Of these selected, relatively simple organosilanes of formula I, it is preferred to use the bis-(3-trimethoxy-, -triethoxy- and -tripropoxy-silylpropyl)-oligosulphides, particularly the di-, tri-, tetra- and pentasulphides and, above all, the triethoxy compounds containing 2, 3 or 4 sulphur atoms and mixtures thereof. In general formula I, Alk represents a difunctional, linear or branched hydrocarbon radical, preferably a saturated alkylene radical having a straight carbon chain with from 1 to 4 carbon atoms which may optionally be interrupted by a phenylene radical.

Examples of compounds which can be used within the invention include 3,3'bis (trimethoxysilylpropyl) disulfide, 3,3'-bis (triethoxy silylpropyl) tetrasulfide, 3,3'-bis (trimethoxysilylpropyl) tetrasulfide, 2,2'-bis(-triethoxysilylethyl) tetrasulfide, 3,3'-bis (trimethoxysilylpropyl) trisulfide, 3,3'-bis (triethoxysilylpropyl) trisulfide, 3,3'-bis(trimethoxysilylpropyl)hexasulfide, 3,3'-bis (tricyclooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl)pentasulfide, 3,3'-bis(tricyclohexooxysilylpropyl) tetrasulfide, 3,3'-bis(tricyclopentoxysilylpropyl) trisulfide, 2,2'-bis(tri-2''-methylcyclohexoxysilylethyl) tetrasulfide, 3,3'-bis(trimethoxysilylpropyl) tetrasulfide, 3-methoxy ethoxy propoxysilyl 3'-diethoxybutoxysilylpropyltetrasulfide, 2,2'-bis(dimethylmethoxysilylethyl) disulfide, 2,2'-bis(dimethyl sec.butoxysilylethyl) trisulfide, 3,3'-bis methyl butylethoxysilylpropyl) tetrasulfide, 3,3'-bis(di-t-butylmethoxysilylpropyl)tetrasulfide, 2,2'-bis(phenyl methyl methoxysilylethyl) trisulfide, 3,3'-bis(diphenyl isopropoxysilylpropyl) tetrasulfide, 3,3'-bis(diphenylcyclohexoxysilylpropyl) disulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyldiethoxysilylpropyl) disulfide, 3,3'-bis(butyl dimethoxysilylpropyl)trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 4,4'-bis(trimethoxysilylbuten-2-yl) tetrasulfide, 4,4'-bis(trimethoxysilylcyclohexylene) tetrasulfide, 5,5'-bis(dimethoxy methylsilylpentyl)trisulfide, 3,3'-bis(trimethoxysilyl-2-methylpropyl)-tetrasulfide, 3,3'-bis(dimethoxyphenylsilyl-2-methylpropyl)disulfide, 10,10'-bis(triethoxysilyldecyl) tetrasulfide.

The silanes are used in quantities of from about 1.0 to 10 parts by weight, based on the quantity of rubber (100 parts by weight), although they are in addition incorporated into the claimed molar ratio to accelerator and sulphur. Where silicate filler is present in the rubber mixture, the silane may be used in a quantity of from about 1 to 25 parts by weight per 100 parts by weight of silicate filler.

The rubber mixtures preferably also contain antiagers or mixtures of known antiagers in the usual quantities, i.e. in quantities of from 0.1 to 10 parts by weight, based on 100 parts by weight of rubber.

It may be of advantage to add plasticiser oils, for example highly aromatic or naphthenic plasticiser oils, to the rubber mixtures, particularly for the production of treads for vehicle tires. For winter tire treads for example, these plasticiser oils should have a low setting point of from 0° C. to −60° C. and preferably from −10° C. to −55° C. The plasticiser oil may be used in quantities of from about 3 to 100 parts by weight, again based on 100 parts by weight of rubber.

In addition there can be added to the rubber mixtures oxides of polyvalents metals which are used in rubber technology in amounts of 0.05 to 10 parts by weight based on 100 parts by weight of the rubber. In the first order of these metal oxides there is included zinc oxide and/or magnesium oxide, particularly in finely divided or active form. Furthermore there are usable magnesium oxide and lead oxide as well as the oxides of alkaline earth metals, e.g. calcium oxide and other heavy metal oxides. There also can be used mixtures of metal oxides, particularly in the most desired co-use of halogen containing types of rubbers as, e.g. rubbers from 2-chlorobutadiene.

The rubber mixtures furthermore preferably contain an organic acid which is solid at room temperature and already is used in rubber technology in amounts of 0.05 to 10 parts weight based on 100 parts by weight of the rubber used. Preferred are the fatty acids such as stearic acid, palmitic acid, lauric acid or corresponding fatty acids of the homologous series containing 12 to 24 carbon atoms in the molecule, e.g. tetraeicosanic acid, additionally there can be used benzoic acid or salicylic acid.

The other optional ingredients of the mixture are auxiliaries known per se in rubber technology and may be used in the usual quantities. Auxiliaries such as these include inter alia heat stabilisers, light stabilisers, ozone stabilizers, processing aids, plasticisers, tackifiers, blowing agents, dyes, pigments, waxes, extenders and activators.

For use, the described organosilanes, the accelerators and, optionally, other additives may be added beforehand to the rubber mixtures or to a few other constituents or to one constituent of the mixture, for example the filler. In some cases, it may be advisable to hydrolyse the organosilanes or to subject them to partial hydrolysis before use. However, it is better, particularly for reasons of easier metering and handling, to add the oligosulphidic silanes to part of the silicate filler to be used which converts the normally liquid organosilanes into a powder-form processing product. A mixture of equal parts by weight of the previously mentioned silane Si 69 and an active silica filler (Ultrasil ®VN3) has proved to be very favourable. This silica filler may also be replaced by an equal amount of carbon black. In some cases, it is even possible, although not of any particular advantage, uniformly to apply the organosilanes from their solution to the surface of the filler particles and to use them in this form. All three or even only two of the described modes of application may even be combined.

The rubber mixtures may be produced by the so-called "upside-down" process which is also known as "overhead mixing". The mixture of the Examples were produced as follows. The mixer used was a so-called kneader whose rotor speed was 40 r.p.m. Friction amounts to 1:1.16 and the initial temperature was 80° C. In the first stage, all the rubber was introduced over a period of one minute, after which the first half of the filler, the zinc oxide, the stearic acid and the silane were added over a period of around 1.5 minutes. The second half of the filler was then added, again over a period of 1.5 minutes.

The subsequent general cleaning of the kneader elements, including the ram, took one minute, after which the antiager(s) and the remaining chemicals were introduced. After a total mixing time of 5.5 minutes, the master batch formed was removed. The master batch was then stored for 24 hours at room temperature. The second mixing stage was then carried out in the same kneader rotating at the same speed, with the same friction and at the same initial temperature, the master batch, whereby the sulphur and the accelerator(s) being mixed over a period of 1.5 minutes and processed to form a mixture in which the ingredients were uniformly dispersed.

The invention is illustrated by the following Examples in which the ingredients of the mixture are measured in parts by weight, unless otherwise indicated.

The compositions can comprise consist essentially of or consist of the materials set forth and the process can comprise, consist essentially of or consist of the steps set forth.

Description of the Preferred Embodiments

EXAMPLE 1

The following four mixtures are prepared from the mixture ingredients indicated. Nixture No. 3 corresponds to the invention:

|  | Mixture No. | | | |
|---|---|---|---|---|
|  | 1 | 2 | 3 | 4 |
| Natural rubber (RSS I, Defo 1000[1]) | 100 | 100 | 100 | 100 |
| Rubber-grade carbon black N—220 | 42 | 40 | 40 | 40 |
| Silica filler VN 3 gran.[2] | 12 | 20 | 20 | 20 |
| Plasticiser oil (highly aromatic; setting point ± 0° C.) | 3 | 3 | 3 | 3 |
| Tackifier[3] | 3 | 3 | 3 | 3 |
| Stearic acid | 2.5 | 2.5 | 2.5 | 2.5 |
| Zinc oxide | 5 | 5 | 5 | 5 |
| Anti-ozonantwax (paraffin-based)[4] | 1 | 1 | 1 | 1 |
| N—isopropyl-N'—phenyl-p-phenylene diamine | 2.5 | 2.5 | 2.5 | 2.5 |
| Poly-2,2,4-trimethyl-1,2-dihydro-quinoline | 1.5 | 1.5 | 1.5 | 1.5 |
| Si 69[5] | — | — | 3 | 3 |
| Benzothiazyl-N—sulphene morpholide | 1.2 | 1.2 | 1.2 | 1.2 |
| Tetramethyl thiuram monosulphide | 0.1 | 0.1 | 0.1 | 0.1 |
| N—nitrosodiphenyl amine | 0.3 | 0.3 | 0.3 | 0.3 |
| Sulphur | 2 | 2 | 1.5 | 0.75 |

[1]Ribbed smoked sheets 1 have a Defo hardness of 1000
[2]Precipitated active silica containing 87% of $SiO_2$ and having a BET-surface of 210 $m^2/g$ and a mean primary particle size of 18 micrometers in granulated form
[3]A reaction product of p-tert.-butyl phenol and acetylene in the presence of zinc naphthenate: light-brown to dark granulate melting at 110 to 130° C., soluble in hydrocarbons.
[4]Solidification point 61–65° C. (Type G 35, a product of Luneburger Wachsbleiche GmbH, Luneberg)
[5]Bis-(3-triethoxysilylpropyl)-oligosulphide, technical quality, having a sulphur content of at least 22.0% by weight.

Mixture No. 1 is a good standard comparison mixture. This mixture and mixture No. 2 are prior art mixtures, mixture No. 2 corresponding to mixtures Nos. 3 and 4 in its composition except for the missing silane and the addition of sulphur. Mixture No. 4 is intended to show that, unless the rule according to the invention is observed, the required properties cannot be obtained. This rule means that at the vulcanisation temperature of 145° C. the molar ratio of silane to vulcanisation accelerator to sulphur (calculated as $S_8$) is held as 1:1:1 in order to obtain the desired freedom from reversion.

This 1:1:1 molar ratio is correct for the in question Mixture No. 3 of Example 1 which is in accordance with the invention. If then the composition of the rubber mixture is changed, e.g. in regard to the amount and type of mixture components, or if another vulcanisation temperature is desired, then the mentioned molar ratios are also changed. Thus a change of the molar ratio occurs if, for example, another rubber, another carbon black-silica ratio, another silane or another vulcanisation accelerator is employed, or if the respective constituent amounts are changed. Also another molar ratio is fixed if only carbon black or only silica is used as filler.

The reversion values inter alia of the four mixtures were determined by using a Monsanto Rheometer (type MPV) under the following conditions: test time 2 hours: test temperature 145° C.; oscillation 3°; test frequency 3 cycles/minute.

TABLE I

|  | Mixture No. | | | |
|---|---|---|---|---|
|  | 1 | 2 | 3 | 4 |
| Reversion R | 11.4 | 25.5 | 0.0 | <−5 |
| Mooney Scorch Time in minutes (according to DIN 53 523/24 at 130° C.) | 13.5 | 13.5 | 14.0 | 17.0 |
| Mooney viscosity | 72 | 85 | 78 | 76 |

The reversion value for mixture No. 4 could not be determined because a steadily increasing torque (climbing Vulcameter curve) was observed with increasing vulcanisation time (cf. FIG. 4). As shown further below, the vulcanisate resulting from mixture No. 4 cannot be used in practice.

The mixtures were vulcanised at 145° C., a vulcanisation time (VT) of 30 minutes being maintained on one occasion and one of 300 minutes on a second occasion in order to be able to make the freedom from reversion of mixture No. 3 according to the invention more evident in the event of prolonged vulcanisation.

The vulcanisates were tested in accordance with DIN 53 504 using the R1 Standard Ring (6 mm). The results obtained were as follows:

Preliminary note: the upper figure represents the outcome of the test of the test specimen vulcanised for 30 minutes, the lower figure corresponds to the 300-minute vulcanisation time.

TABLE II

|  | of mixture No. | | | |
|---|---|---|---|---|
|  | 1 | 2 | 3 | 4 |
| Tensile strength in MPa | 20.0 | 19.3 | 22.1 | 18.0 |
|  | 15.4 | 14.9 | 19.9 | 19.6 |
| Modulus 300 in MPa | 9.4 | 7.6 | 10.7 | 7.9 |
|  | 7.2 | 5.0 | 11.2 | 9.8 |
| Rebound according to DIN 53 512 (23° C.) in % | 37 | 37 | 38 | 35 |
|  | 32 | 29 | 36 | 33 |
| Resilience according to Healey ASTM D 1054 in % | 62.8 | 60.0 | 59.5 | 58.4 |
|  | 57.4 | 53.7 | 57.4 | 55.9 |
| Tear propagation resistance according to ASTM D 624 using DIE A in N/mm | 93 | 92 | 106 | 115 |
|  | 54 | 21 | 79 | 90 |
| Shore-A-hardness DIN 53 505 (23° C.) | 63 | 61 | 65 | 60 |
|  | 58 | 53 | 65 | 62 |
| VT (exception) Abrasion 60 minutes DIN 53 516 120 minutes (60 minutes) | 108 | 177 | 89 | 112 |
|  | 154 | 250 | 96 | 123 |

Evaluation of the above test values shows that the vulcanisates produced in accordance with the invention from mixture No. 3 give the best individual and overall results:

Tensile strength decreases to a lesser extent than that of the comparison vulcanisate (mixtures 1 and 2) with longer vulcanisation time (VT). The exception is the mixture-4-vulcanisate because, as already mentioned, the Vulcameter curve continues to climb, which is also known as the "marching modulus". The modulus 300 (strain value at 300% elongation) shows a high level. By contrast, the moduli of the comparison vulcanisates show a distinct fall. The exception (from a low level) is the mixture-4-vulcanisate for the reason explained above. The lowest drop in the measured values starting from a high level is also observed in the measurements of the rebound resilience and tear propagation values. The Shore hardness advantageously remains at the same level and the favourable and best DIN-abrasion value is only slightly impaired when the VT is doubled. All these good properties, including complete freedom from reversion (R=0) is only observed in the case of mixture No. 3 and it is this which is crucial to the invention.

Further measured values important to the utility value of the articles produced in accordance with the invention, such as industrial rubber articles or parts of tires for motor vehicles, aircraft, etc. were obtained from the Goodrich Flexometer test carried out in accordance with ASTM Standard D 623 A under the following conditions: VT 30 minutes; test temperature = room temperature; load 11 kp; stroke 0.250 inch; test time 60 minutes. The non-aged test specimens gave the following values:

TABLE III

|  | of mixture No. | | | |
| --- | --- | --- | --- | --- |
|  | 1 | 2 | 3 | 4 |
| Heat build-up in °C. | 100 | 84 | 70 | 105 |
| Static compression in % | 10.0 | 14.5 | 6.6 | 12.8 |
| Dynamic compression in % | 38.5 | 40.0 | 19.5 | 38.9 |
| Compression set in % | 20.2 | d | 14.7 | d |

The letter "d" means that the test specimen did not withstand the test load, but instead was prematurely destroyed. In some cases, the test specimens burst with a bang.

Testing of aged test specimens (1st ageing 3 days at 100° C. in a recirculating air oven, 2nd alternative ageing 7 days at 100° C.) in the same way produced equally favourable results for the mixture-3-vulcanisates. The test specimen of mixture No. 1 aged for 7 days failed after 52.5 minutes under test whilst the test specimen of mixture No. 2 failed after only 10.5 minutes (thermal destruction). The mixture-3-test specimen withstood the entire test without damage.

If the Goodrich Flexometer test is repeated after a longer VT of 300 minutes, the very high stability of the mixture-3-vulcanisates under load is again observed. By contrast, the mixture-1-test specimen, which had previously proved to be relatively stable with the shorter VT, failed after 58 minutes (without ageing), after 35 minutes when aged for 3 days (100° C.) and after 36 minutes when aged for 7 days (100° C.) as a result of thermal decomposition.

The results of the service life test in the Goodrich Flexometer carried out under otherwise the same conditions are particularly revealing. Heating times (VT) of 60 minutes were selected and maintained for this test. The mixture-1-test specimen (average from three test specimens) were destroyed by thermal decomposition after 78 minutes and the test specimens of mixture No. 2 on average after 13 minutes whereas the mixture-3-test specimens remained intact for an average time of 137 minutes and were only mechanically destroyed thereafter. The corresponding values of the test specimens aged for three days at 100° C. were 38 minutes (mixture No. 1), 11 minutes (mixture No. 2) and 82 minutes (mixture No. 3). These figures speak for themselves.

Treads were produced from the known standard mixture 1 and mixture No. 3 according to the invention.

175 SR 14 tires were produced with these treads and tested for wear and durability (total number of kilometers covered on motorways, primary roads and Nurnburgring = 17,581). The total tread wear index as an overall evaluation standard amounted to 119% for the tires produced in accordance with the invention based on the figure of 100% laid down for the standard tires. To illustrate these figures, it may be stated that, under the same conditions as prevail for example in one and the same vehicle, the standard tires show the same wear after running for 100 days as the new tires after running 119 days (19% better useful life).

The four Figures show that the somewhat simplified trend of the Vulcameter curve (torque Md against the heating time t in minutes after a preheating time of 1 minute; test temperature 145° C.) for the four abovementioned mixtures: the customary downwardly sloping branch for the known mixtures 1 (FIG. 1) and 2 (FIG. 2) and the undesirable upward slope of the elongate branch of the Vulcameter curve of mixture 4 (FIG. 4). The Vulcameter curve in FIG. 3 is the curve of the tested mixture 3 obtained in accordance with the invention which ends in an elongate, horizontal section and which slopes neither upwards or downwards, even after a test period of 120 minutes and longer, which reflects the freedom of reversion (R=0) of the mixture or vulcanisates. According to the above formula II, the reversion R is nil when the molar ratio of silane (general formula I) to accelerator to sulfur (expressed as $S_8$) is adjusted at the required vulcanisation temperature in such a way that the Vulcameter curve ends in the same way as the curve in FIG. 3. Since the vulcanisation time for example is also selected in accordance with the trend of the Vulcameter curve in practice, no difficulty or significant extra expense is involved in determining the above-described molar ratio by means of the Vulcameter curve for the particular rubber mixture.

EXAMPLE 2

This Example is intended to demonstrate the influence of the vulcanisation temperature (VTE) on the molar ratio critical to the invention.

In otherwise the same basic mixtures as in Example 1 (mixture 5 corresponds to mixture 1; mixtures 6 and 7 correspond to mixture 3), the parts by weight of the silane, the accelerator and the sulphur (based on 100 parts by weight of rubber) in mixtures 6 and 7 according to the invention were changed accordingly, the VTE for mixture No. 6 being 160° C. and for mixture No. 7 170° C. Mixture 5 is the comparison mixture. The mixture ingredients which stayed the same as in Example 1 were omitted.

TABLE IV

|  | Mixture No. | | |
| --- | --- | --- | --- |
|  | 5 | 6 | 7 |
| Silane Si 69 | — | 3.5 | 4.0 |
| Accelerator (benzothiazyl-N—sulphene morpholide) | 1.2 | 1.65 | 1.88 |
| Tetramethyl thiuram monosulphide | 0.1 | — | — |
| N—nitrosodiphenyl amine | 0.3 | | |
| Sulphur | 2.0 | 0.84 | 0.76 |

As described in Example 1, the mixtures were tested for 2 hours in a Monsanto Rheometer, mixture 5 at 160° C. and 170° C., mixture 6 at 160° C. and mixture 7 at 170° C. The conditions and the units of the measured values were otherwise the same as in Example 1. The results of the tests for reversion (see formula II) etc. were as follows:

TABLE V

| | of mixture No. | | |
|---|---|---|---|
| | 5 | 6 | 7 |
| Reversion 160° C. | 28.6 | 0 | |
| Reversion 170° C. | 40.6 | | 0 |
| Modulus 300 (160° C.) | | | |
| a. for VT 10 and 15 minutes | 9.9 | 10.4 | (VT 15 mins.) |
| b. for VT 60 minutes | 6.9 | 11.9 | |
| c. for VT 120 minutes | 6.5 | 12.0 | |
| Tear propagation (160° C.) according to ASTM D 624 DIE A | | | |
| a. for VT 10 and 15 minutes | 105 | 109 | (VT 15 mins.) |
| b. for VT 60 minutes | 69 | 119 | |
| c. for VT 120 minutes | 43 | 81 | |
| Shore-A-hardness (160° C.) | | | |
| a. for VT 10 and 15 minutes | 63 | 65 | (VT 15 mins.) |
| b. for VT 60 minutes | 59 | 68 | |
| c. for VT 120 minutes | 59 | 68 | |
| abrasion (DIN 53 516) (160° C.) | | | |
| a. for VT 10 and 15 minutes | 91 | 88 | (VT 15 minutes) |
| b. for VT 60 minutes | 200 | 85 | |
| c. for VT 120 minutes | 217 | 83 | |
| Modulus 300 (170° C.) | | | |
| a. for VT 6 and 10 minutes | 10.6 | | VT 10: 10.8 |
| b. for VT 60 minutes | 6.5 | | 12.8 |
| c. for VT 120 minutes | 6.6 | | 12.0 |
| Shore-A-hardness (170° C.) | | | |
| a. for VT 6 and 10 minutes | 62 | | VT 10: 65 |
| b. for VT 60 minutes | 57 | | 68 |
| c. for VT 120 minutes | 57 | | 68 |
| Tensile strength (DIN 53 504) (170° C.) in MPa | | | |
| a. for VT 6 and 10 minutes | 24.3 | | VT 10: 19.7 |
| b. for VT 60 minutes | 16.8 | | 19.0 |
| c. for VT 120 minutes | 16.7 | | 18.8 |

The test results again clearly demonstrate the superiority of the invention. Free from reversion (R=0, formula II), the vulcanisates produced in accordance with the invention show distinctly better results and hence have superior utility or service properties. The Vulcameter curves of mixtures 6 and 7 also show the charcteristic trend in analogy to the curve in FIG. 3.

EXAMPLE 3

Where different vulcanisation accelerators are used, different ratios by weight are required on account of their different molecular weights and under the rule according to the invention.

Accordingly, the bsic mixture No. 3 of Example 1 was varied with different accelerators (once again only the changed agents and quantities are indicated):

TABLE VI

| | Mixture No. | | | | | |
|---|---|---|---|---|---|---|
| | 8 | 9 | 10 | 11 | 12 | 13 |
| Silane Si 69 | 3 | 3 | 3 | 3 | 3 | 3 |
| Sulphur | 1.43 | 1.43 | 1.43 | 1.43 | 1.43 | 1.43 |
| 2-Mercaptobenzthiazole | 0.93 | — | — | — | — | — |
| 2,2'-dibenzothiazyl-disulphide | — | 1.85 | — | — | — | — |
| N,N—dicyclohexyl-2-benzothiazyl sulphenamide | — | — | 1.93 | — | — | — |
| N—Oxydiethylene-2-benzothiazole sulphenamide | — | — | — | 1.41 | — | — |
| N—t-butylbenzothiazyl-sulphenamide | — | — | — | — | 1.33 | — |
| N—cyclohexyl-2-benzothiazyl sulphenamide | — | — | — | — | — | 1.47 |

As in Example 1, mixtures 8 to 13 were tested for 2 hours in a Monsanto Rheometer under the same conditions as in Example 1. The results obtained were as follows:

TABLE VII

| | of mixture No. | | | | | |
|---|---|---|---|---|---|---|
| | 8 | 9 | 10 | 11 | 12 | 13 |
| Reversion (145° C.) | 0 | 0 | 4.1 | 1.6 | 0 | 2.0 |
| Mooney Scorch Time t5 | 7.0 | 7.2 | 19.6 | 16.7 | 13.6 | 14.3 |
| Mooney Cure Time t35 (Mooney Test according to DIN 53 523/24 at 130° C.) | 10.6 | 9.9 | 25.7 | 24.4 | 18.1 | 17.9 |
| Modulus 300 (MPa) | 7.6 | 9.3 | 11.2 | 10.5 | 11.1 | 10.7 |
| Tensile strength (DIN 53 504. MPa) | 17.8 | 19.9 | 22.4 | 22.2 | 22.1 | 22.1 |
| For VT (minutes) | 30 | 25 | 38 | 25 | 25 | 20 |

Accordingly, the Mooney Scorch and Cure Times may be varied through the choice of the accelerator without any significant change in the properties of the vulcanisates. This range of variation represents a valuable enrichment so far as industrial practice is concerned.

EXAMPLE 4

Two rubber mixtures are prepared from the following ingredients in the same way as described above. Mixture No. 14 is the comparison mixture.

| | Mixture No. | |
|---|---|---|
| | 14 | 15 |
| Rubber SMR 5[1] | 100 | 100 |
| Rubber-grade carbon black N 330 | 30 | 30 |
| Clay[2] | 60 | 60 |
| Silane Si 69 | — | 3 |
| Zinc oxide | 3 | 3 |
| Stearic acid | 2 | 2 |
| N—cyclohexyl-2-benzothiazole sulphenamide[3] | 1 | 1.47 |
| Sulphur | 2 | 1 |

[1]Standard Malaysian Rubber containing at most 0.05% of impurities
[2]Suprex Clay, a product of the J. M. Huber Corp., Locust, N.J., U.S.A.
[3]Vulcanisation accelerator Whereas mixture No. 14 showed a reversion R of 10.7 in the Monsanto Rheometer Test at 140° C. under otherwise the same conditions as in Example 1, a reversion R of 1.3 was calculated in accordance with formula II for mixture No. 15, which signifies virtual freedom from reversion of the vulcanisate. Further tests showed that, where vulcanisation was carried out at distinctly higher temperatures of 160° and 170° C., mixture No. 15 no longer produced reversion-free vulcanisates. After vulcanisation at 150° C., the mixture-15-vulcanisate again showed very good property values, as evidenced by the following figures:

TABLE VIII

| | of mixture No. | |
|---|---|---|
| | 14 | 15 |
| Modulus 300 (MPa) | 13.7 | 15.0 |
| Rebound (DIN 53 512) in % | 45 | 45 |
| Shore-A-hardness (DIN 53 505) | 68 | 68 |

In addition to the already repeatedly described advantages associated with freedom from reversion, the mixture-15-vulcanisate according to the invention shows other favourable properties.

EXAMPLE 5

Mixtures containing solely carbon black as filler may also be processed in accordance with the invention.

|  | Mixture No. | |
| --- | --- | --- |
|  | 16 | 17 |
| Natural Rubber RSS1 | 100 | 100 |
| Defo 1000 (cf. Example 1) | | |
| Rubber-grade carbon black N 220 (Degussa's CORAX ®) | 50 | 50 |
| Zinc oxide | 3 | 3 |
| Stearic acid | 2 | 2 |
| Benzothiazyl-N—sulphene morpholide | 1 | 1.41 |
| Sulphur | 2 | 1.0 |

Comparison mixture 16 showed a reversion R of 11.3 whereas mixture 17 according to the invention showed a reversion R of 1.3 which represents virtual freedom from reversion.

The property values of the vulcanisates obtained at a VTE of 150° C. for a VT ensuing from the Vulcameter curve (at $t_{90\%}$) were as follows:

TABLE IX

|  | of mixture No. | |
| --- | --- | --- |
|  | 16 | 17 |
| VT (minutes) | 16 | 30 |
| Tensile strength (DIN 53 504. MPa) | 21.3 | 22.3 |
| Modulus 300 (MPa) | 15.8 | 14.6 |
| Breaking elongation (%) | 390 | 420 |
| Rebound (DIN 53 512. %) | 42 | 42 |
| Shore-A-hardness (DIN 53 505) | 68 | 67 |

According to the invention, therefore, it is possible to obtain freedom from reversion and, at the same time, favourable vulcanisate properties comparable with those of a conventional carbon-black-filled rubber mixture.

EXAMPLE 6

Mixtures of various rubbers are also accessible to the mixtures and the process according to the invention. Mixture No. 18 is a comparison mixture which gives good results.

|  | Mixture No. | |
| --- | --- | --- |
|  | 18 | 19 |
| Natural rubber (RSS I, cf. Example 1) | 50 | 50 |
| Polybutadiene rubber with a high cis-1,4-content | 50 | 50 |
| Silica filler VN 3 (cf. Example 1) | — | 15 |
| Rubber-grade carbon black N 375 | 45 | 30 |
| Zinc oxide | 5 | 5 |
| Stearic acid | 2 | 2 |
| Plasticiser oil (cf. Example 1) | 8 | 8 |
| Poly-2,2,4-trimethyl-1,2-dihydroquinoline | 1.5 | 1.5 |
| N—isopropyl-N'—phenyl-p-phenylene diamine | 0.8 | 0.8 |
| Silane Si 69 | — | 2.25 |
| Benzothiazyl-N—sulphene morpholide | 0.8 | 1.06 |
| Sulphur | 1 | 0.75 |

Testing of the mixtures in a Monsanto Rheometer at 150° C. (under otherwise the same conditions as in Example 1) produced a reversion R of 13.1 for mixture 18 and a reversion R of 0 for mixture 19.

After vulcanisation at 150° C., the vulcanisates produced the following test results:

TABLE X

|  | of mixture No. | |
| --- | --- | --- |
|  | 18 | 19 |
| Tensile strength in MPa | 21.6 | 21.7 |
| Modulus 300 in MPa | 5.2 | 5.7 |
| Resilience according to Healey (ASTM D 1054) in % | 57.9 | 61.9 |
| Shore-A-hardness (DIN 53 505) | 53 | 52 |

These figures show that the mixture No. 19 according to the invention is not only free from reversion, the mixture-19-vulcanisates are also superior in their service properties.

EXAMPLE 7

The following rubber mixtures illustrate the favourable effects which result from the above described additional use of vulcanisation retarders in the mixture based on the retarder N-cyclohexylthiophthalimide:

|  | Mixture No. | | |
| --- | --- | --- | --- |
|  | 20 | 21 | 22 |
| Natural rubber (RSS I) | 100 | 100 | 100 |
| Rubber-Grade carbon black N—220 | 40 | 40 | 40 |
| Silica filler VN 3 (see Example 1) | 20 | 20 | 20 |
| Zinc Oxide | 5 | 5 | 5 |
| Stearic Acid | 2.5 | 2.5 | 2.5 |
| N—Isopropyl-N'—phenyl-p-phenylendiamine | 2.0 | 2.0 | 2.0 |
| Poly-2,2,4-trimethyl-1,2-dihydroquinoline | 0.5 | 0.5 | 0.5 |
| Antiozonant wax (see Example 1) | 2.0 | 2.0 | 2.0 |
| Plasticiser oil aromatic (see Example 1) | 8.0 | 8.0 | 8.0 |
| Benzothiazol-2-sulfenmorpholid | 1.0 | — | — |
| Benzothiazyl-2-cyclohexyl = sulphenamide | — | 1.25 | 1.25 |
| N—cyclohexylthiophthalimide | — | — | 0.3 |
| Sulphur | 1.5 | 1.6 | 1.6 |
| Mixture of equal parts by weight of Si 69 (see Example 1) and rubber-grade carbon black N 330 | — | 5.1 | 5.1 |

The testing (see Example 1) of the mixtures produces the following characteristic measurement results

|  | Mixture No. | | |
| --- | --- | --- | --- |
|  | 20 | 21 | 22 |
| Reversion (in %) at 142° C. test temperature | 9.7 | 2.0 | 1.2 |
| Induction period (in seconds) | 583 | 542 | 797 |

Mixture No. 20 is a comparison mixture which is cross-linked conventionally with sulphur and vulcanisation accelerators. Mixtures 21 and 22 are according to the invention wherein Mixture No. 22 additionally contains a small amount of 0.3 parts by weight of a vulcanisation retarder. From the measured results it can be seen in particular that Mixture No. 22 has practically the same good reversion resistance as Mixture No. 21 but additionally due to the presence of the vulcanisation retarder has a definitely longer induction period which is the time between the beginning of the test and the time of the clear increase of the cross-linking isotherm. The induction period in practice corresponds to the scorch time which is the time up to the start of the vulcanisation.

The new rubber mixtures contain the essential rubbers from the above described group (A), such as preferably natural rubber and/or polyisoprene rubber, best in a predominant quantity down to 50% by weight, in some cases even to as low as 10%, based on the weight of the total amount of rubber.

The advantages afforded by the invention are significant, particularly in industrial practice, for example in the manufacture of large pneumatic tires (off the road tires) for heavy transport vehicles, for earth-moving machines and the like.

Further applications for the described rubber mixtures and the process according to the invention include in particular technical rubber articles, such as cable sheaths, hoses, drive belts, V-belts, conveyor belts, roller coverings, motor vehicle tires, particularly car, truck and cross-country vehicle tires and treads, carcasses and sidewalls (cross-country vehicle tires include any large pneumatic tires for earth-moving machines, transporters, desert vehicles and the like), also damping elements, sealing rings, sole materials for shoes and many others. The new rubber mixtures have also proved to be effective for coupling mixtures for more firmly uniting rubber with reinforcing materials and reinforcing inserts, particularly fibres, fibre structures and wires, for example of glass, metals (for example steel cord, etched, zinc-plated or brass-plated) and textile materials (polyamide, polyester or polyarylamide fabrics and the like).

There is hereby incorporated by reference the entire disclosure of German priority application No. P 28 48 559.8–43.

What is claimed is:

1. A composition which is a formable and vulcanisable rubber mixture comprising a rubber (A) which still contains double bonds and which can be cross-linked with sulphur and a vulcanisation accelerator to form an elastomer or a mixture of such a rubber (A) with a different rubber (B) and from 0.2 to 10 parts by weight of sulphur, from 0.2 to 10 parts by weight of at least one vulcanisation accelerator and from 1 to 10 parts by weight of a silane corresponding to the formula $$[R_n^1(RO)_{3-n}Si\text{-}Alk\text{-}]_2S_x \quad (I)$$

in which

R and $R^1$ represent an alkyl group containing from 1 to 4 carbon atoms, a cycloalkyl group containing from 5 to 8 carbon atoms or the phenyl radical; all the radicals R and $R^1$ may be the same or different in meaning, n=0, 1 or 2, Alk is a difunctional hydrocarbon radical containing 1 to 10 carbon atoms, and x is a number of from 2.0 to 8.0, or its hydrolysate, all parts by weight being based on 100 parts by weight of rubber, wherein the rubber mixture contains the silane, vulcanisation accelerator and sulphur, expressed as $S_8$, in such a molar ratio that, at the vulcanisation temperature, the rubber mixture has a reversion R resulting from the cross-linking isotherm (DIN 53 529) of 0 ($\pm$5%), the reversion R being calculated in accordance with the following formula:

$$R = \frac{D_{max} - D_{(max+60\,mins)}}{D_{max} - D_{min}} \cdot 100 \quad (II)$$

in which $D_{max}$ is the maximum vulcameter torque, $D_{min}$ is the minimum vulcameter torque, $D_{(max+60\,mins)}$ is the vulcameter torque as measured 60 minutes after appearance of the maximum torque.

2. A rubber mixture according to claim 1 wherein n is 0, R is alkyl of 1 to 4 carbon atoms and Alk is an alkylene group having 2 to 4 carbon atoms.

3. A rubber mixture according to claim 1 containing (1) 1 to 300 parts by weight of silicate filler, (2) from 0.1 to 150 parts by weight of carbon black filler or (3) a mixture of a silicate filler and a carbon black filler, the total amount of filler being 1 to 300 parts by weight of which 0.1 to 150 parts by weight is carbon black, all parts by weight being based on 100 parts by weight of rubber.

4. A rubber mixture according to claim 3 wherein n is 0, R is alkyl of 1 to 4 carbon atoms and Alk is an alkylene group of 2 to 4 carbon atoms.

5. A rubber mixture according to claim 4 wherein x is a number from 2.0 to 4.0.

6. A rubber mixture according to claim 3 wherein the filler consists essentially of a silicate filler.

7. A rubber mixture according to claim 3 wherein the filler consists essentially of a carbon black filler.

8. A rubber mixture according to claim 3 wherein the filler consists essentially of a mixture of a silicate filler and a carbon black filler.

9. A rubber mixture according to claim 3 wherein rubber (B) is carboxyl rubber, epoxide rubber, trans-polypentamer, halogenated butyl rubber, 2-chlorobutadiene polymer, ethylene-vinyl acetate copolymer or ethylenepropylene copolymer.

10. A rubber mixture according to claim 3 wherein rubber (A) is a natural rubber, polyisoprene rubber or a mixture thereof.

11. A rubber mixture according to claim 1 wherein the rubber mixture contains (a) bis-(3-triethoxysilyl-propyl)-oligosulphide having at least 22.0 weight percent of sulphur, (b) a sulphenamide vulcanisation accelerator and (c) sulphur in a molar ratio of 1:1:1 with a deviation of not over $\pm$0.1 for a vulcanisation temperature of 145° C. $\pm$3° C.

12. A rubber mixture according to claim 11 wherein the silane is present in the rubber mixture in an amount of 1 to 25 parts by weight, based on 100 parts by weight of silicate filler.

13. A rubber mixture according to claim 12 including 0.05 to 5 parts by weight of a vulcanisation retarder based on 100 parts by weight of rubber.

14. A rubber mixture according to claim 13 wherein the vulcanisation retarder is N-cyclohexyl-thiophthalimide, polynitroso-2,2,4-trimethyl-1,2-dihydroquinoline or a mixture of these two retarders.

15. A rubber mixture according to claim 11 including 0.05 to 5 parts by weight of a vulcanisation retarder based on 100 parts by weight of rubber.

16. A rubber mixture according to claim 3 wherein the silane is present in the rubber mixture in an amount of 1 to 25 parts by weight, based on 100 parts by weight of silicate filler.

17. A rubber mixture according to claim 16 including 0.05 to 5 parts by weight of a vulcanisation retarder based on 100 parts by weight of rubber.

18. A rubber mixture according to claim 3 including 0.05 to 5 parts by weight of a vulcanisation retarder based on 100 parts by weight of rubber.

19. A rubber mixture according to claim 3 wherein the silane is present in the rubber mixture in an amount of 1 to 25 parts by weight, based on 100 parts by weight of silicate filler.

20. A rubber mixture according to claim 1 including 0.05 to 5 parts by weight of a vulcanisation retarder based on 100 parts by weight of rubber.

21. A rubber mixture according to claim 3 where x is 3.0 to 4.0, n is 0 and R is alkyl of 1 to 4 carbon atoms.

22. A rubber mixture according to claim 1 where the silane is bis-(3-triethoxysilylpropyl)-oligosulphide having at least 22.0 weight percent of sulphur.

23. A rubber mixture according to claim 1 where x is 3.0 to 4.0, n is 0 and R is alkyl of 1 to 4 carbon atoms.

24. A rubber mixture according to claim 1 where the silane is bis-(3-triethoxysilylpropyl)-oligosulphide having at least 22.0 weight percent of sulphur.

25. A process for vulcanising moulding composition based on a rubber (A) which still contains double bonds and which can be crosslinked with sulphur and a vulcanisation accelerator to form an elastomer or on a mixture of such a rubber (A) with a different rubber (B) using from 0.2 to 10 parts by weight of sulphur, from 0.2 to 10 parts by weight of a vulcanisation accelerator and from 1 to 10 parts by weight of a silane corresponding to the formula $$[R_n^1(RO)_{3-n}Si\text{-Alk-}]_2S_x \qquad (I)$$

in which
R and $R^1$ represent an alkyl group containing from 1 to 4 carbon atoms, a cycloalkyl group containing from 5 to 8 carbon atoms or the phenyl radical; all the radicals R and $R^1$ may be the same or different in meaning,
n=0, 1 or 2,
Alk represents a difunctional hydrocarbon radical containing from 1 to 10 carbon atoms and
x is a number of from 2.0 to 8.0, all parts by weight being used on 100 parts by weight of rubber or its hydrolysate comprising moulding and heating a composition to the selected vulcanisation temperature, thoroughly heating at that temperature and cooling, characterised in that the molar ratio of the silane to accelerator to sulphur, expressed as $S_8$, in the moulding composition is selected in such a way that, at the vulcanisation temperature, the reversion R resulting from the crosslinking isotherm (DIN 53 529) is 0 ($\pm 5\%$), as determined in accordance with the following formula:

$$R = \frac{D_{max} - D_{(max + 60\ mins.)}}{D_{max} - D_{min}} \cdot 100$$

in which
$D_{max}$ is the maximum vulcameter torque,
$D_{min}$ is the minimum vulcameter torque,
$D_{(max+60\ min)}$ is the vulcameter torque as measured 60 minutes after appearance of the maximum torque.

26. A process according to claim 25 wherein the rubber mixture is one containing (1) 1 to 300 parts by weight of a silicate filler, (2) from 0.1 to 150 parts by weight of a carbon black filler or (3) a mixture of a silicate filler and a carbon black filler, the total amount of filler being 1 to 300 parts by weight of which 0.1 to 150 parts by weight is carbon black, all parts by weight being based on 100 parts by weight of rubber.

27. A process as claimed in claim 26, characterised in that there is employed a mixture based on natural rubber, polyisoprene rubber or a mixture of natural rubber and polyisoprene rubber which contains (a) a silane of the formula $[(C_2H_5O)_3Si\text{-}(CH_2)_3\text{-}]_2S_x$, in which $x=3.0$ to 4.0, (b) a vulcanisation accelerator from the class of sulphenamide accelerator and (c) sulphur, expressed as $S_8$, in a molar ratio of 1:1:1 (with a deviation of $\pm 0.1$ in each case), the rubber mixture is vulcanised at 145° C. ($\pm 3$° C.) and, on completion of vulcanisation, is cooled.

28. A process according to claim 27 wherein the silane has at least 22.0 weight percent of sulphur.

29. A tire prepared by vulcanising the composition of claim 1 at a temperature where the reversion is $\pm 5\%$.

30. A tire according to claim 29 wherein the vulcanisation is at 142° to 148° C.

31. A tire prepared by vulcanising the composition of claim 3 at a temperature where the reversion is $\pm 5\%$.

32. A tire according to claim 31 wherein the vulcanisation is at 145° C. $\pm 3$° C.

33. A tire prepared by vulcanising the composition of claim 5 at a temperature where the reversion is $0\pm 5\%$.

34. A tire according to claim 33 wherein the vulcanisation is at 142° to 148° C.

35. A tire prepared by vulcanising the composition of claim 11 at a temperature where the reversion is $0\pm 5\%$.

36. A tire according to claim 35 wherein the vulcanisation is at 142° to 148° C.

37. A tire prepared by vulcanising the composition of claim 12 at a temperature where the reversion is $0\pm 5\%$.

38. A tire according to claim 37 wherein the vulcanisation is at 142° to 148° C.

39. A process for vulcanising moulding composition based on a rubber (A) which still contains double bonds and which can be crosslinked with sulfur and a vulcanisation accelerator to form an elastomer or on a mixture of such a rubber (A) with a different rubber (B) using from 0.2 to 10 parts by weight of sulphur, from 0.2 to 10 parts by weight of a vulcanisation accelerator and from 1 to 10 parts by weight of a silane corresponding to the formula $$[R_n^1(RO)_{3-n}Si\text{-Alk-}]_2S_x \qquad (I)$$

in which
R and $R^1$ represent an alkyl group containing from 1 to 4 carbon atoms, a cycloalkyl group containing from 5 to 8 carbon atoms or the phenyl radical; all the radicals R and $R^1$ may be the same or different in meaning,
n=0, 1 or 2,
Alk represents a difunctional hydrocarbon radical containing from 1 to 10 carbon atoms, and
x is a number of from 2.0 to 8.0,
all parts by weight being used on 100 parts by weight of rubber comprising moulding and heating the composition to a selected vulcanisation temperature, thoroughly heating at that temperature and cooling, characterised in that the molar ratio of the silane to accelerator to sulfur, expressed as $S_8$, in the moulding composition is selected in such a way that, at the vulcanisation temperature, the reversion R resulting from the crosslinking isotherm (DIN 53 529) is 0 (±5%), as determined in accordance with the following formula:

$$R = \frac{D_{max} - D_{(max + 60\ mins.)}}{D_{max} - D_{min}} \cdot 100$$

in which
$D_{max}$ is the maximum vulcameter torque,
$D_{min}$ is the minimum vulcameter torque,
$D_{max+60\ min}$ is the vulcameter torque as measured 60 minutes after appearance of the maximum torque.

40. A process according to claim 39 wherein the vulcanisation is carried out 142° to 148° C.

41. A process according to claim 25 wherein the vulcanisation is carried out at 142° to 148° C.

42. A composition which is a formable and vulcanisable rubber mixture comprising a rubber (A) which still contains double bonds and which can be cross-linked with sulphur and a vulcanisation accelerator to form an elastomer or a mixture of such a rubber (A) with a different rubber (B) and from 0.2 to 10 parts by weight of sulphur, from 0.2 to 10 parts by weight of at least one vulcanisation accelerator and from 1 to 10 parts by weight of a silane corresponding to the formula $$[P_n{}^1(RO)_{3-n}Si\text{-Alk-}]_2S_x \tag{1}$$

in which R and $R^1$ represent an alkyl group containing from 1 to 4 carbon atoms, a cycloalkyl group containing from 5 to 8 carbon atoms or the phenyl radical; all the radicals R and $R^1$ may be the same or different in meaning, n=0, 1 or 2, Alk is a difunctional hydrocarbon radical containing 1 to 10 carbon atoms, and x is a number of from 2.0 to 8.0, all parts by weight being based on 100 parts by weight of rubber, wherein the rubber A mixture contains silane, vulcanisation accelerator and sulphur, expressed as $S_8$, in such a molar ratio that, as the vulcanisation temperature, the rubber mixture has a reversion R resulting from the cross-linking isotherm (DIN 53 529) of 0 (±5%), the reversion R being calculated in accordance with the following formula:

$$R = \frac{D_{max} - D_{(max+60\ mins)}}{D_{max} - D_{min}} \cdot 100 \tag{II}$$

in which
$D_{max}$ is the maximum vulcameter torgue,
$D_{min}$ is the minimum vulcameter torque,
$D_{(max+60\ mins)}$ is the vulcameter torque as measured 60 minutes after appearance of the maximum torque.

43. A rubber mixture according to claim 42 wherein n is 0, R is alkyl of 1 to 4 carbon atoms and Alk is an alkylene group having 2 to 4 carbon atoms.

44. A composition which is a formable and vulcanisable rubber mixture comprising a rubber (A) which still contains double bonds and which can be cross-linked with sulphur and a vulcanisation accelerator to form an elastomer or a mixture of such a rubber (A) with a different rubber (B) and from 0.2 to 10 parts by weiht of sulphur, from 0.2 to 10 parts by weight of at least one vulcanisation accelerator and from 1 to 10 parts by weight of a silane corresponding to the formula $$[R_n{}^1(RO)_{3-n}Si\text{-Alk-}]_2S_x \tag{I}$$

in which R and $R^1$ represents an alkyl group containing from 1 to 4 carbon atoms, a cycloalkyl group containing from 5 to 8 carbon atoms or the phenyl radical; all the radicals; all the radicals R and $R^1$ may be the same or different in meaning, n=0, 1 or 2, Alk is a difunctional hydrocarbon radical containing 1 to 10 carbon atoms, and x is a number of from 2.0 to 8.0, and also containing (1) 1 to 300 parts by weight of silicate filler, (2) from 0.1 to 150 parts by weight of carbon black filler or (3) a mixture of a silicate filler and a carbon black filler, the total amount of filler being 1 to 300 parts by weight of which 0.1 to 150 parts by weight is carbon black, all parts by weight being based on 100 parts by weight of rubber, wherein the rubber A mixture contains the silane, vulcanisation accelerator and sulphur, expressed as $S_8$, in such a molar ratio that, as the vulcanisation temperature, the rubber mixture has a reversion R resulting from the cross-linking isotherm (DIN 53 529) of 0 (±5%), the reversion R being calculated in accordance with the following formula:

$$R = \frac{D_{max} - D_{(max+60\ mins)}}{D_{max} - D_{min}} \cdot 100 \tag{II}$$

in which
$D_{max}$ is the maximum vulcameter torque,
$D_{min}$ is the minimum vulcameter torque,
$D_{(max+60\ mins)}$ is the vulcameter torque as measured 60 minutes after appearance of the maximum torque.

45. A rubber mixture according to claim 44 wherein n is 0, R is alkyl of 1 to 4 carbon atoms and Alk is an alkylene group of 2 to 4 carbon atoms.

46. A rubber mixture according to claim 45 wherein x is a number from 2.0 to 4.0.

47. A rubber mixture according to claim 44 wherein the filler consists essentially of a silicate filler.

48. A rubber mixture according to claim 44 wherein the filler consists essentially of a carbon black filler.

49. A rubber mixture according to claim 44 wherein the filler consists essentially of a mixture of a silicate filler and a carbon black filler.

50. A rubber mixture according to claim 44 wherein rubber (B) is carboxyl rubber, epoxide rubber, trans-polypentamer, halogenated butyl rubber, 2-chlorobutadiene polymer, ethylenevinyl acetate copolymer or ethylene-propoylene copolymer.

51. A rubber mixture according to claim 44 wherein rubber (A) is a natural rubber, polyisoprene rubber or a mixture thereof.

52. A tire prepared by vulcanizing at a temperature where the reversion is 0±5%, a composition which is a formable and vulcanisable rubber mixture comprising a rubber (A) which still contains double bonds and which can be cross-linked with sulphur and a vulcanisation accelerator to form an elastomer or a mixture of such a rubber (A) with different rubber (B) and from 0.2 to 10 parts by weight of sulphur, from 0.2 to 10 parts by weight of at least one vulcanisation accelerator and from 1 to 10 parts by weight of a silane corresponding to the formula $$[R_n{}^1(RO)_{3-n}Si\text{-Alk-}]_2S_x \tag{I}$$

in which R and $R^1$ represent an alkyl group containing from 1 to 4 carbon atoms, a cycloalkyl group containing from 5 to 8 carbon atoms or the phenyl radical; all the radicals R and $R^1$ may be the same or different in meaning, n=0, 1 or 2, Alk is a difunctional hydrocarbon radical containing 1 to 10 carbon atoms, and x is a number of from 2.0 to 8.0, all parts by weight being based on 100 parts by weight of rubber, wherein the rubber A mixture contains the silane, vulcanisation accelerator and sulphur, expressed as $S_8$, in such a molar ratio that, as the vulcanisation temperature, the rubber mixture has a reversion R resulting from the cross-linking isotherm (DIN 53 529) of 0 ($\pm 5\%$), the reversion R being calculated in accordance with the following formula:

$$R = \frac{D_{max} - D_{(max+60\ mins)}}{D_{max} - D_{min}} \cdot 100 \qquad (II)$$

in which
  $D_{max}$ is the maximum vulcameter torque,
  $D_{min}$ is the minimum vulcameter torque,
  $D_{(max+60\ mins)}$ is the vulcameter torque as measured 60 minutes after appearance of the maximum torque.

53. A tire according to claim 52 wherein the vulcanisation is at 142° to 148° C.

* * * * *